United States Patent [19]
Song

[11] Patent Number: 5,890,418
[45] Date of Patent: Apr. 6, 1999

[54] COFFEE BEAN ROASTER

[76] Inventor: You Jin Song, E-209 Hanyang Apt., 42, Yoido-Dong, Youngdungpo-Ku, Seoul, Rep. of Korea

[21] Appl. No.: 132,383

[22] Filed: Aug. 11, 1998

[30] Foreign Application Priority Data

Feb. 12, 1998 [KR] Rep. of Korea ............... 1998-4099

[51] Int. Cl.⁶ .................. A23L 1/18; A23N 12/08; A47J 31/42; F26B 9/08
[52] U.S. Cl. .................. 99/323.7; 99/286; 99/323.5; 99/331; 99/340; 99/468; 99/476; 99/483; 34/233; 34/594
[58] Field of Search ............... 99/323.5, 323.7, 99/323.9, 331–333, 339, 340, 348, 467, 468, 473–476, 469, 483, 286; 126/21 A; 34/225, 233, 360, 368, 392, 394, 576, 594, 494, 499, 109, 136; 219/400, 502, 386, 385; 426/445, 466, 467, 520

[56] References Cited

U.S. PATENT DOCUMENTS

| | | | |
|---|---|---|---|
| 4,271,603 | 6/1981 | Moore, III | 34/233 X |
| 4,325,191 | 4/1982 | Kumagai et al. | 99/286 X |
| 4,425,720 | 1/1984 | Elevitch | 219/386 X |
| 4,484,064 | 11/1984 | Murray | 219/400 |
| 4,494,314 | 1/1985 | Gell, Jr. | 99/323.7 |
| 4,638,607 | 1/1987 | Lemme et al. | 219/385 X |
| 4,860,461 | 8/1989 | Tamaki et al. | 99/286 X |
| 4,871,901 | 10/1989 | Igusa et al. | 219/400 |
| 5,269,072 | 12/1993 | Waligorski | 34/594 |
| 5,359,788 | 11/1994 | Gell, Jr. | 99/323.7 X |
| 5,564,331 | 10/1996 | Song | 99/469 |
| 5,609,097 | 3/1997 | Newnan | 99/483 X |
| 5,735,194 | 4/1998 | Cochran | 99/483 |

*Primary Examiner*—Timothy F. Simone
*Attorney, Agent, or Firm*—Crockett & Fish; Robert D. Fish

[57] ABSTRACT

A coffee bean roaster comprises a cylinder-shaped housing, a roasting vessel, a hemishpere-shaped lid, a guiding duct and a handle duct. The housing has a duct connections part protruded in one side. Corresponding to the housing, a lower plate is formed on a bottom face. A partition plate is formed in an upper end. A placement part having air inducing holes is placed above the partition plate. A fan is installed. A heater upper plate and a heater lower plate are placed in the upper end of the placement part. A heater coil is placed between the two plates to form a heater assembly. Corresponding to the roasting vessel, a guiding part is placed at the bottom face of a heated air blower. Blowing holes are formed on the outer perimeter surface of the heated air blower in the oblique direction, a spindle is formed therein. The coffee bean roaster has an excellent roasting capacity by a strong whirlwind, and easily removes the hulls of the raw beans. The power consumption can be reduced by 30–40% by re-using waste heat generated inside the roasting vessel without exhausting it outside. This invention is small and simple in size, convenient in use, and low in sound during use. Accordingly, the present invention can be easily assembled and disassembled, and the packing and carrying of the product is convenient. Furthermore, the production cost is lower than before by 30–40%.

12 Claims, 4 Drawing Sheets

COFFEE BEAN ROASTER

BACKGROUND OF THE INVENTION

1. Field of the Invention

This invention relates to a coffee bean roaster capable of roasting coffee beans with heated air, characterized in that raw coffee beans and pop corn can be uniformly roasted within the space between a blower and a roasting vessel by generating a strong whirlwind from the heated air blower, and that the amount of power used can be reduced by not exhausting waste heat and circulating the waste heat inside the roasting vessel through a duct.

2. Prior Art

In general, coffee is classified as raw bean coffee, raw bean ground coffee, and instant coffee. Since raw bean coffee is superior in taste and fragrance among them, 90% of the population drinking coffee in Europe are purchasing at a high price raw bean coffee which is roasted and sold by a package from a factory. Most families enjoying roasted bean coffee have a coffee grinder or mill. Roasting raw beans at home not only provides a fresh taste and fragrance but also is very economical in view of the price difference of 1:3 or 1:5 between raw beans and processed beans.

Also, vacuum-wrapped roasted bean coffee cannot be stored over 6 months from the exfactory, but raw beans have the best taste 1–2 years after the harvest because the raw beans which are stored for a term mature well. Therefore, at this time a roaster is needed for home use which allows the storage of raw beans conveniently since sealing up raw beans for storage is not required, and which is able to roast at one time approximately 160 g raw beans which correspond to a maximum 20 cups used per day. However, at present there is no coffee bean roaster for home use which is worldwide commercialized after the second world war.

The prior roaster for roasting coffee beans with heated air was previously filed on Oct. 1, 1994 by the present applicant as U.S. Pat. No. 5,564,331. In such prior roaster, the quality of roasting depends on the generation of a whirlwind, but the whirlwind was not strong because it was generated at the bottom of the roasting vessel; the power consumption was as much as approximately 1300~1400 W; the fan was noisy because the motor had to be rotated at a speed as high as over about 11,000 ppm for generating the whirlwind; the apparatus was not easily hermetically sealed nor kept because the roasting vessel is composed of detachable glass; users are required to handle it with care; and there were difficulties in assembling, exporting, selling, packing, and transporting the apparatus due to a number of parts and the high production cost.

THE SUMMARY OF THE INVENTION

The object of this invention is to provide a coffee bean roaster for home use, in which a cylindrical heated air blower of which the upper portion is dome-shaped, generates a strong whirlwind in the center of a roasting vessel in order to smoothly roast a maximum amount of 160 g coffee beans (20 cups for Europeans and 26 cups for Americans), and thereby the roasting capability is improved and the removal of hulls is easy; and the power consumption can be reduced to about 30–40% of the prior consumption by using the circulated heat induced by a guiding duct and a handle duct. Also, the coffee bean roaster is small in size, simple in appearance, convenient in use, low in sound, and the production cost is lower than before by 30–40%.

To obtain the object, a coffee bean roaster comprising a cylinder-shaped housing with a duct connection part protruded in one side, wherein a lower plate having air inlets is formed on a bottom face, a partition plate inclined at a side of said duct connection part is formed in an upper end, a motor is installed beneath said partition plate, a placement part having air inducing holes, a heater mounting projection, and a guide mounting projection is positioned above said partition plate, a fan is installed at an upper end of a motor axis penetrating upwardly from a bottom of said placement part, a heater upper plate and a heater lower plate which has lower part inducing holes are placed in said placement part, a heater assembly equipped with a heater coil is formed between the two plates, and a timer having a lamp switch and a knob is installed in said duct connection part; a roasting vessel, wherein a supporting annular plate is formed in a lower end, a lower edge of a cylindrical and bottom-opening heated air blower is connected to a skirt-shaped guiding part for inducing air into the interior of said heated air blower, the lower edge of the heated air blower is mounted on said guide mounting projection so that said heated air blower is fixed, blowing holes are formed in the oblique direction on the outer perimeter surface of said heated air blower, a trumpet-shaped spindle is inserted to the interior of said heated air blower, so that a whirlwind generated from the interior of said heated air blower is easily exhausted through said blowing holes, and a pressing spring formed in the lower edge of said spindle is placed on the heater upper plate in order to support said heater assembly; a hemisphere-shaped lid which is attachably and detachably combined with the upper portion of said roasting vessel; a guiding duct combined with and linked to said lid; and a handle duct, of which the upper end is combined with said guiding duct, so that a waste heat is circulated in order to roast raw bean coffee, and of which the lower end is combined with the upper end of the inclined part of said partition plate.

BRIEF DESCRIPTION OF THE DRAWINGS

This invention will be better understood and its various objects and advantages will be more fully appreciated from the following description taken in conjunction with the accompanying drawings, in which.

DETAILED DESCRIPTION OF THE PREFERRED EMBODIMENT

Hereinafter, this invention will be described in detail with reference to the drawings.

Figure 1:
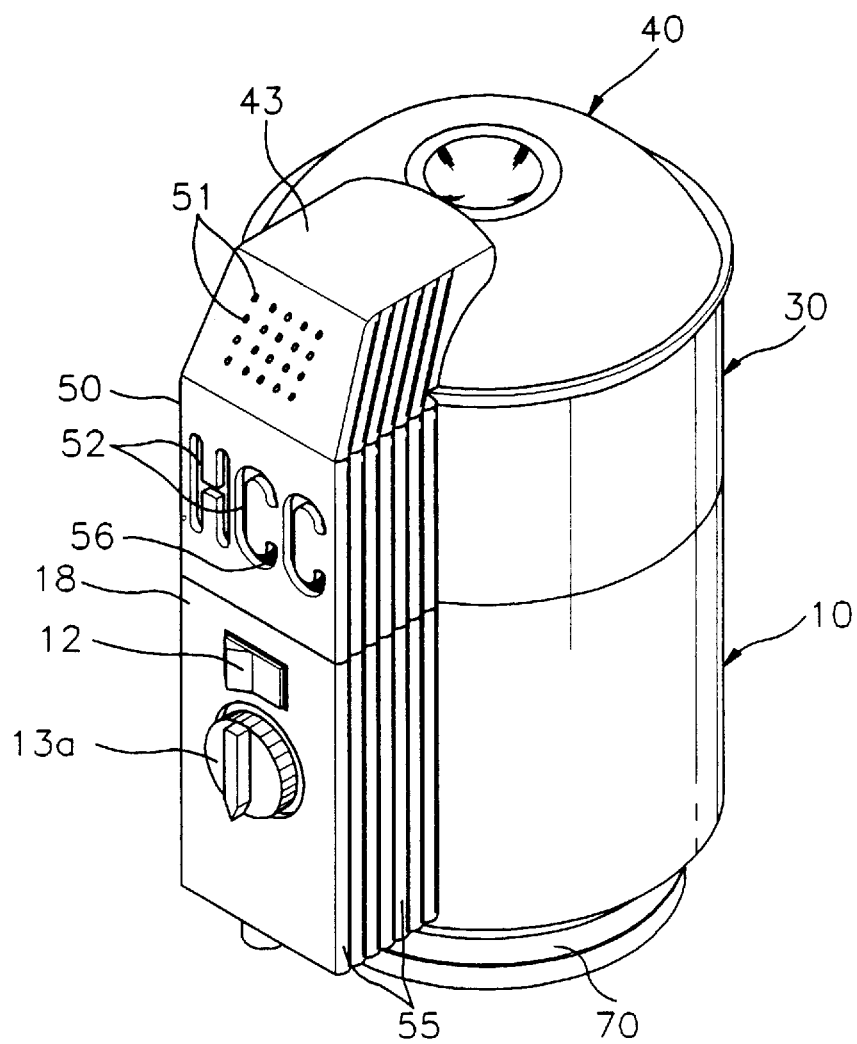
FIG. 1 is a perspective view showing the assembled state of the present invention.
Figure 2:
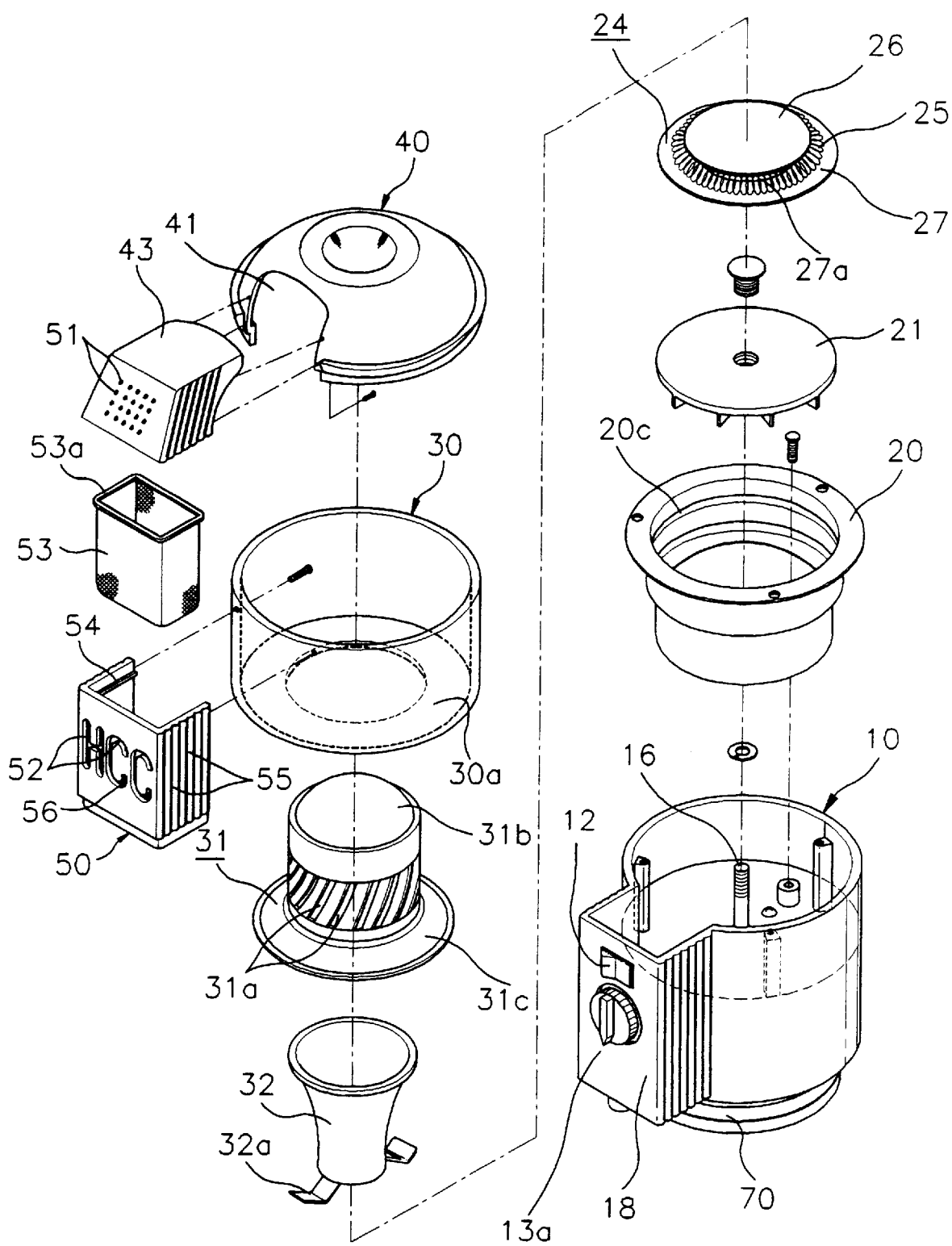
FIG. 2 is a perspective view showing the exploded state of the present invention.
Figure 3:
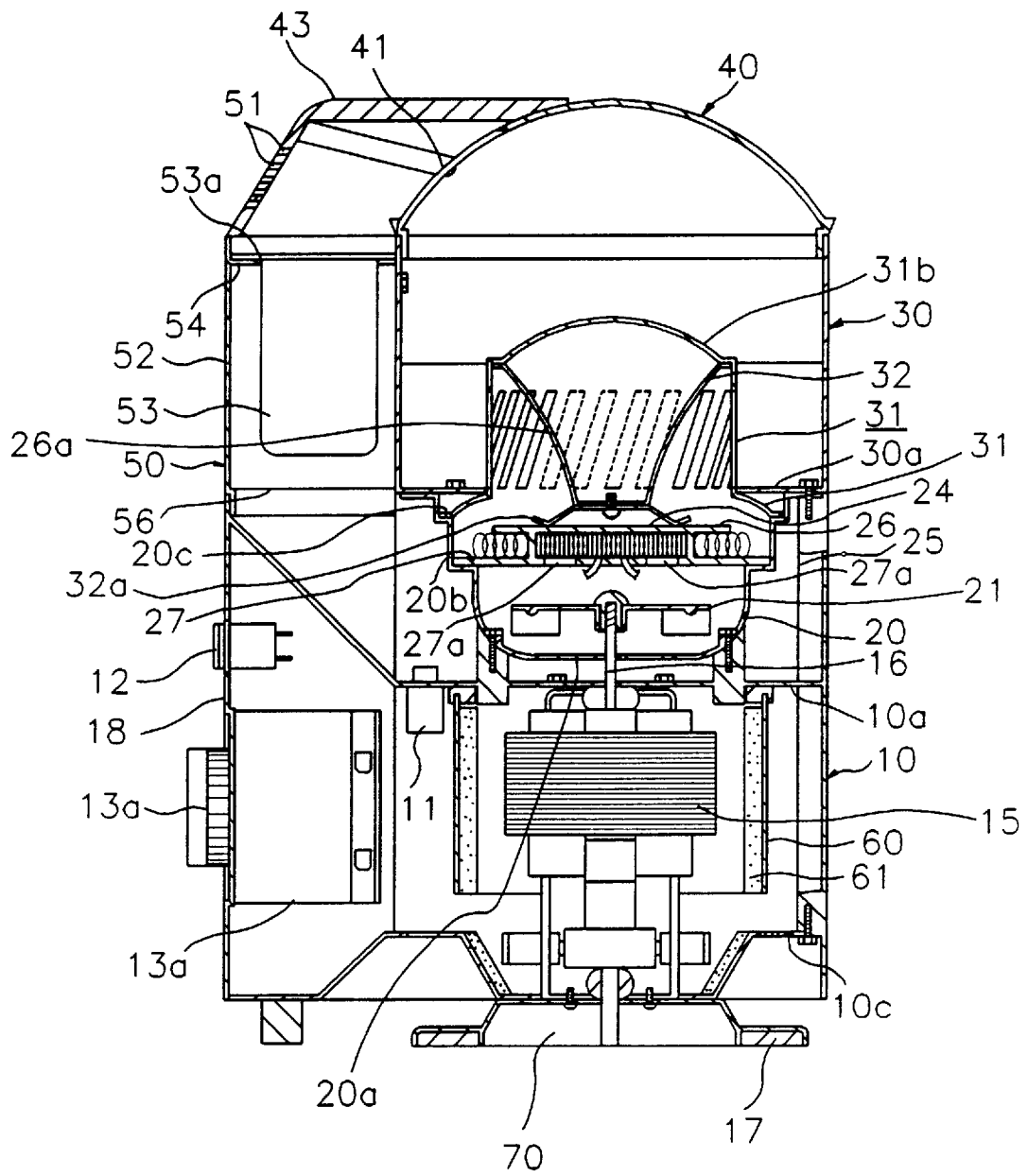
FIG. 3 is a vertical cross-sectional view of the present invention.

As illustrated in FIGS. 1–3, the present invention comprises a housing 10, a roasting vessel 30, a lid 40, a guiding duct 43, and a handle duct 50.

In a cylinder-shaped housing 10 with a duct connection part 18 protruded in one side, a lower plate 10b provided with air inlets 10c inducing the exterior air is formed on the bottom face, a plurality of rubber feet are provided for preventing slippage to the lower end of said lower plate 10b having a skirt shape, a cord rolling member 70 is installed for manually rolling in a power cord supplied with the power, a partition plate 10a inclined at the side of said duct connection part 18 is formed in the upper end, so that a placement bowl 20 in which a heat generating part is installed is formed in the upper portion of said partition plate 10*a* and heat-resistant electric parts are installed in the lower portion, a heater mounting projection 20*b* mounting a heater assembly 24 thereon and a guide mounting projection 20*c* mounting the lower end of a guiding part 31*c* thereon are formed inside said placement bowl 20, a noise absorbing sponge 61 for reducing mechanical noise and a motor supported by an electromagnetic wave shield iron plate 60 for shielding electromagnetic waves are installed on the bottom face of said partition plate 10*a*, a motor axis 16 connected to said motor 15 penetrates the bottoms of said partition plate 10*a* and said placement part 20, a fan 21 which rotates by receiving the transmitted rotation power of said motor 15 is horizontally installed at the edge of said motor axis 16, air inducing holes 20*a* for inducing waste heat and exterior air are formed on the bottom face of said placement part 20, a heater upper plate 26 and a heater lower plate 27 which has lower part inducing holes 27*a* are placed in the upper end of said placement part 20, a heater assembly 24 in which a heater coil 25 is placed is formed between the two plates, a thermostat 11 measuring the temperature of a waste heat, and opening and closing the supply of power to said heater coil 25 is installed in said partition plate 10*a*, a lamp switch 12 and a knob 13*a* capable of being recognized from the outside are provided to said duct connection part 18, and said knob 13*a* has a timer 13 connected thereto built-in.

Also, in a roasting vessel 30, a cylindrical and bottom-opening heated air blower 31 is connected to a skirt-shaped guiding part 31*c* for inducing air into the interior of said heated air blower 31, the upper end of said guiding part 31*c* is supported by an annular plate 30*a* and the lower end is mounted on said guide mounting projection 20*c* so that said heated air blower 31 is fixed, the upper portion of said heated air blower has a dome shape so that raw beans may slip down from the upper end of the heated air blower 31 and gather between the roasting vessel 30 and the heated air blower 31 when raw beans are put into the roasting vessel 30, blowing holes 31*a* having a 60° angle in the oblique direction are formed on the outer perimeter of said heated air blower 31, a trumpet-shaped spindle 32 is inserted to the interior of said heated air blower 31, so that the whirlwind generated from the interior of said heated air blower 31 is easily exhausted through said blowing holes 31*a*, and a pressing spring 32*a* formed in the lower edge of said spindle 32 is placed on the heater upper plate 26 in order to support said heater assembly 24.

The heated air blower 31 is formed in a protruded and cylindrical shape in the central part of said roasting vessel 30, and the blowing holes 31*a* have more than 16 inlet and outlet slots, of which the intervals are regular, the tilt angle is approximately 60°, the gap of each blowing opening is 1.6~1.8 mm, and the length of the oblique is 14~16 mm.

The lid 40 has a bottom-opening hemisphere shape, is fixed by sticking to said guiding duct 43 with screws, and is attachably and detachably combined with the upper end of said roasting vessel 30.

The guiding duct 43 sticks to said lid 40 with screws in order to be linked to said lid 40 and a handle duct 50, and on the outer surface are formed a plurality of exhaust holes 51 through which the smoke generated during the roasting of raw beans is exhausted.

The air inducing holes 20*a* are formed on the bottom face of the placement part 20, and the fan 21 is rotated and blows in the lower end. A heater assembly 24 is mounted on a heater mounting projection 20*b*. The upper end of said spindle 32 is supported by the upper end of the heated air blower 31, and a pressing spring 32*a* is connected to the lower end of said spindle 32, so that the lower end is mounted on a heater upper plate 36 in order to fix the heater assembly 24.

In a heat-resistant handle duct 50 capable of standing heat at the temperature of 230° C. max. by being made from phenol which is a heat-resisting resin, the upper end is linked to said guiding duct 43 and fixed by sticking to said roasting vessel with screws, the lower end is combined with the upper end of the body 10, a plurality of air inlets 52 are formed on the outer surface so that fresh exterior air can flow in, a suspending projection 53*a* is formed in the upper end in such a way that a suspended projection 54 of a filter sieve 53 is suspended and fixed by said suspending projection 53*a*, a safety filter sieve 56 having smaller meshes than said filter sieve 53 is placed in the inner lower end, and projection parts 41 are formed on both of the outer sides for an easy grip.

In addition, said housing 10 is also made from phenol which is a heat-resisting resin. The partition plate 10*a* is integrally formed therein so that the upper portion and the lower portion can be separated, and waste gas prevents the heat of the roasting vessel from being transmitted to the motor 15, the timer 13, the lamp switch 12, and the electric wires in the lower portion.

The process for roasting raw beans or beans by using the coffee bean roaster of the present invention assembled above is as follows:

First of all, raw beans are put into the roasting vessel 30 after opening the lid 40. At this time, the raw beans are fed to the height of the dome 31*b* formed in the heated air blower 31, and thereby the quantity of the raw beans put into the interior of the roasting vessel 30 amounts to approximately 160 g. And then, the appropriate time is set according to the required roasting state by operating the knob 13*a* mounted on the duct connection part 18. Namely, the descriptions such as "very dark" indicating heating for about 10 minutes in order to make espresso coffee, "dark" indicating heating for about 8 minutes in order to make regular coffee, and "regular" and "weak" indicating heating for about 7 minutes and 5 minutes in order to make weak mocha coffee, are indicated on the front face of the knob 13*a*, and if the power is applied, the timer 13 regulates the heating time of the raw beans.

As described above, if the heating time is set, the heater coil 25 is energized, and the heating starts, the lamp switch 12 indicates by being lit that the heater coil 25 is being operated, and the fan 21 is rotated by the operation of the motor, so that air ascends into the interior of the heated air blower 31. Namely, the air induced through the air inlets 52 formed in the handle duct 50 moves to the inside of the handle duct 50, and then it moves along the inclined part of the partition plate 10*a*, until it is induced to the air inducing hole 20*a* formed on the bottom of the placement part 20. At this time, since the motor 15 makes a mechanical noise by rotating at 8,000~10,000 rpm, the noise absorbing sponge 61 absorbs the noise, and the electromagnetic wave shield iron plate 60 shields the electromagnetic waves.

The exterior air induced as described above ascends to the heated air blower 31 by the fan 21. And then, the ascending induced air moves to the upper portion through the lower part inducing hole 27*a* of the heater lower plate and is heated by the heater coil 25. The heated hot air is induced to the bottom of the heated air blower 31 through the outer side of the heater upper plate 26.

Also, the heated hot air induced to the interior of the heated air blower 31 as described above comes out of the heated air blower 31 through the blowing holes 31a by the strong vortex injected by the pressure in the trumpet-shaped spindle 32.

At this time, since the blowing holes 31a are formed at about a 60° angle on the outer perimeter of the heated air blower 31, the air forms a strong whirlwind while coming out. The heated air of the whirlwind forms a vortex by touching the wall of the roasting vessel 30, so that the coffee beans easily ascend rotatively. Therefore, the hot whirlwind air formed as above allows the raw beans in the roasting vessel 30 to move upwardly and downwardly, so that the raw beans are roasted uniformly.

Also, since the upper end of the heated air blower 31 has a dome shape, the raw beans which have ascended to the upper portion of the heated air blower 31 easily slip down along the surface of the dome 31b.

Since the raw beans rub with one another in the roasting vessel 30 while rotating and moving upwardly and downwardly, the beans have expanded and hulls come off. Also, the hulls blow upwardly by the whirlwind air ascending by means of the blow out power of the fan 21, and then are caught in the filter sieve 53 installed in the upper end of the lower portion of the handle duct 50.

The smoke generated during the roasting of the raw beans in the roasting vessel 30 rises up, and then is exhausted through the exhaust holes 51 formed in the upper portion of the handle duct 50.

The air generated from the placement part 20 becomes waste heat after the raw beans are roasted in the roasting chamber 30. The waste heat is not exhausted outwardly but descends along the lower side of the lid 40 in the handle duct 50, until it is mixed with the exterior air induced through the air inlets 52. At this time, the waste heat and the induced exterior fresh air are mixed in the ratio of 80% and 20%. The air mixed with the waste heat as above descends along the inclined side of the partition plate 10a at about a 120° C., and then it is induced again through the air inducing holes 20a formed on the bottom face of the placement part 20. Also, since the heated hot air blower 31 has sufficient space in its interior, the heated air and the non-heated air are easily mixed therein, and the heated air accumulates. The mixed air as above provides the roasting vessel 30 with the heated air by being continuously circulated by the heater assembly 24 and the fan 21, so that the raw beans are roasted well. And, the spindle 32 is inserted to the interior to the heated air blower 31, so that a whirlwind generated from the interior of the heater air blower 31 is easily exhausted through the blowing holes 31a.

The air induced to the lower end of the main body through the air inlets 10c formed in the lower end of the housing 10 cools the motor 15.

The normal temperature in the inside of the raw bean roasting vessel is approximately 200° C.~220° C. However, because of the thermostat 11 installed therein, if the temperature rises over 220° C., the thermostat 11 is operated to interrupt the power supplied to the heater coil 25, and only the fan 21 rotates. Accordingly, since the air is not heated, the raw beans are roasted only with the remaining heat. After that, if the temperature of the waste heat falls below 120° C. of the normal temperature, the temperature of the supplied air increases to be approximately 200° C.~220° C., the normal temperature, by supplying again the power to the heater coil 25.

If the timer 18 reaches the set time, the power of the heater coil 25 is interrupted. However, the motor 15 and the fan 21 are continuously supplied with the power, so that only cold air is induced to the housing 10 through the air inlets 52 of the handle duct 50, and then the fresh air cools not only the hot roasted coffee beans in the roasting vessel 30 but also the handle duct 50. The cooling time is set in the timer 13 at about three minutes, and if the timer 13 is off three minutes later, the fan stops rotating because the power supplied to the motor 15 is interrupted.

If the coffee beans are roasted appropriately by means of the operation of the raw coffee bean roaster as above, the lid 40 is to be separated from the roasting vessel 30 by raising the lid 40 upwardly. And then, after the handle 53b of the filter sieve 53 provided in the handle duct 50 is gripped and the filter sieve 53 is raised, the hulls of the raw beans accumulated inside are thrown away.

If the raw bean roaster is tilted after gripping the outside of the handle duct 50, the roasted raw beans inside the roasting vessel 30 fall. At this time, since projection parts 41 are formed on both of the outer sides of the handle duct 50, the gripping hand prevents slipping.

If the filter sieve 53 is inserted into the handle duct 50, the suspended projection 54 of the filter sieve 53 is suspended to be fixed by the suspending projection 53a formed in the upper end of the handle duct 50. And then, the lid 40 and the upper portion of the the handle duct 50 are combined with the roasting vessel 30 and the lower portion of the handle duct 50.

In the event that the roasting vessel is operated when the filter sieve 53 is not positioned at the predetermined position in the roasting vessel or after the filter sieve 53 is detached, and in the event that the hulls of the roasted raw beans are so small that the hulls pass through the filter sieve 53, the meshes formed in the lower portion of the filter sieve 53 prevent the hulls of the raw beans from being induced to the housing by the small safety filter sieve 56.

If the power cord is detached from the socket at home after using the roasting vessel, the power cord is automatically rolled in by the cord rolling member 16.

Figure 4:
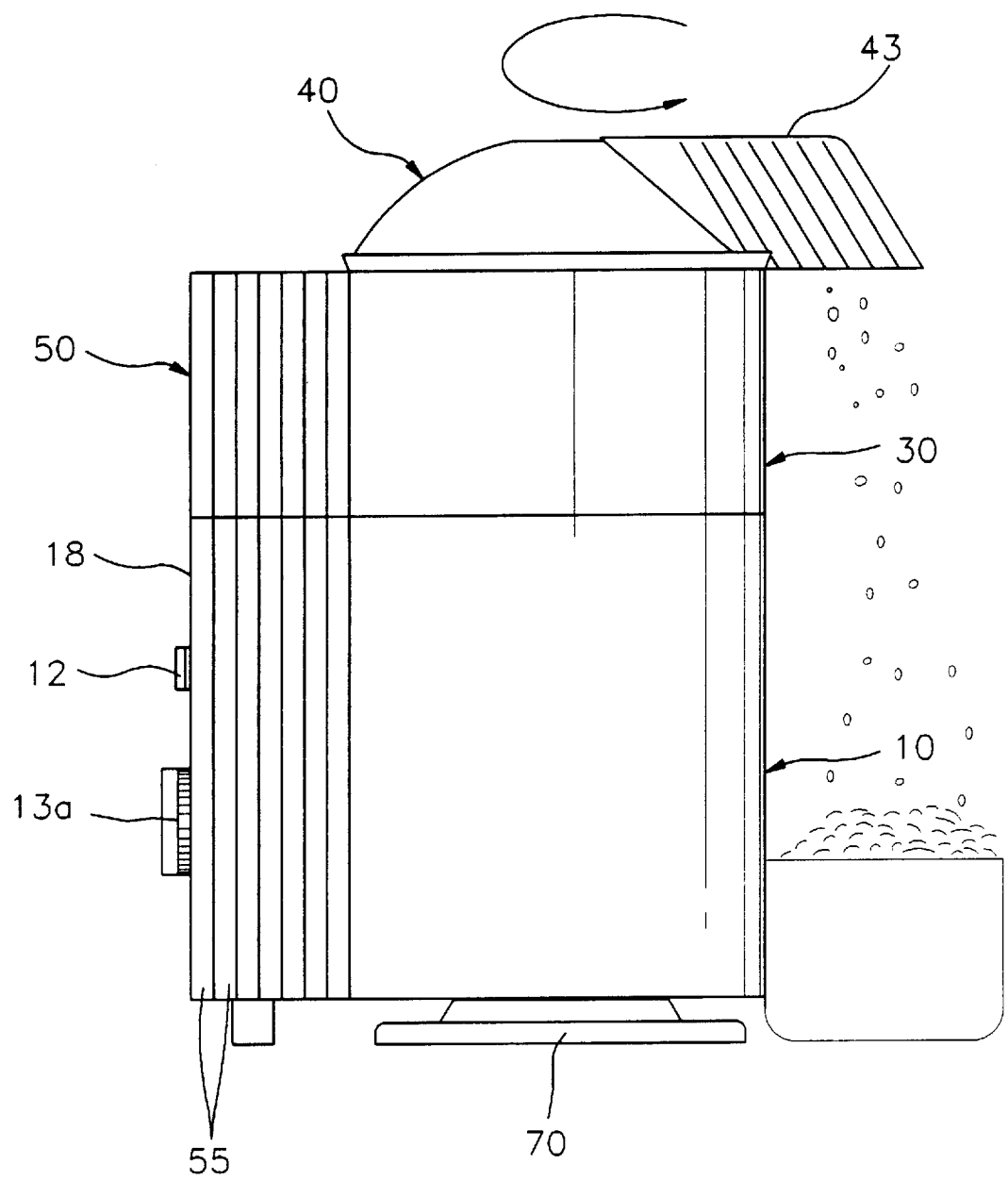
FIG. 4 is a schematic view showing another embodiment of the present invention.

In addition, the process for making popcorn by using the roasting vessel is as shown in FIG. 4.

First of all, the lid 40 is opened, and the corn kernels which are the material of the popcorn are put into the roasting vessel. As coffee bean roasting processing, the kernels are popped by the heated air by operating the heater assembly 24 for about one minute with the lid closed. If the kernels start to sound popped after about one minute, as shown in FIG. 4, the upper portion of the handle duct 50 is made to turn toward the other side not to cover up the lower portion of the handle duct 50 by rotating the upper portion of the handle duct 50 combined to the lid 40. The corn kernels are then popped by the heated air within the roasting vessel, and the popped kernels blow upwardly, and hit and collide repeatedly against the bottom surface of the lid 40, until the popped kernels are naturally discharged through the guiding duct 43 of the lid 40 to the outside of the handle duct 50. In the above, since the capacity of the heater assembly 24 is based on the waste heat, after the kernels are sufficiently heated, they can be roasted even with a slight heat.

Since the lid 40 is formed high in the roasting vessel as above, peanuts or beans as well as raw beans or popcorn can be easily roasted.

As described in detail above, since a plurality of blowing holes 31a are formed in the oblique direction on the outer urface of the heated air blower 31 formed in a protruded and cylindrical shape in the central part of the roasting vessel 30, a strong whirlwind is generated. The whirlwind forms a vortex by touching the wall of the roasting vessel 30, which allows the raw beans to ascend rotatively, so the capability to roast the raw beans and to remove their hulls is excellent. The power consumption can be reduced by 30–40% by re-using the circulated waste heat generated inside the roasting vessel without exhausting it outside. This invention is small and simple in size, convenient in use, and low in sound during use. Also, popcorn can be simply popped. Because of the small number of parts, this invention has few troubles, can be easily assembled, and the packing and carrying of the product is convenient. Furthermore, the production cost is lower than before by 30–40%, i.e, has an economical effect.

While this invention has been particularly shown and described with reference to particular embodiments thereof, it will be understood by those skilled in the art that various changes in form and details may be effected therein without departing from the sprit and scope of the invention as defined by the appended claims.

What is claimed is:

1. A coffee bean roaster comprising;
   a cylinder-shaped housing with a duct connection part protruded in one side, wherein a lower plate having air inlets are formed on a bottom face, a partition plate inclined at a side of said duct connection part is formed in an upper end, a motor is installed beneath said partition plate, a placement part having air inducing holes, a heater mounting projection, and a guide mounting projection is positioned above said partition plate, a fan is installed at an upper end of a motor axis penetrating upwardly from a bottom of said placement part, a heater upper plate having a supporting spring is placed on an upper end of the placement part and a heater lower plate which has lower part inducing holes is placed in said placement part, a heater assembly equipped with a heater coil is formed between the two plates, and a timer having a lamp switch and a knob is installed in said duct connection part;
   a roasting vessel, wherein a supporting annular plate is formed in a lower end, a lower edge of a cylindrical and bottom-opened heated air blower is connected to a skirt-shaped guiding part inducing air into the interior of said heated air blower, the lower edge of the heated air blower is mounted on said guide mounting projection so that said heated air blower is fixed, blowing holes are formed in the oblique direction on the outer perimeter surface of said heated air blower, a trumpet-shaped spindle is inserted to the interior of said heated air blower, so that a whirlwind generated from the interior of said heated air blower is easily exhausted through said blowing holes, and a pressing spring formed in the lower edge of said spindle is placed on the heater upper plate in order to support said heater assembly;
   a hemisphere-shaped lid which is attachably and detachably combined with the upper portion of said roasting vessel and on which a sinking portion is formed to disperse air gathered in the center so that makes hulls flow into a guiding duct with ease;
   a guiding duct combined with and linked to said lid; and
   a handle duct, of which the upper end is combined with said guiding duct, so that a waste heat is circulated in order to roast raw bean coffee, and of which the lower end is combined with the upper end of the inclined part of said partition plate.

2. The coffee bean roaster according to claim 1, wherein a suspending projection is formed in the upper end of the handle duct, so that a suspended projection of a filter sieve is suspended and fixed by said suspending projection, and a safety filter sieve is placed in the lower end.

3. The coffee bean roaster according to claim 1, wherein a plurality of air inlets are formed on the outer surface of the handle and a prominence and depression grip is formed on exterior to enhance cooling efficiency and prevent the handle from sliding.

4. The coffee bean roaster according to claim 1, wherein a thermostat measuring the temperature of the waste heat is installed in the partition plate, so that the power supplied to the heater turns on and off in order to maintain a predetermined temperature.

5. The coffee bean roaster according to claim 1, wherein in the central part in a protruded and cylindrical shape is formed the heated air blower, in which the blowing holes are more than 16 at regular intervals, the tilt angle is 60°, the gap of each blowing opening is 1.6~1.8 mm, and the length of the oblique is 14~16 mm, and of which the upper portion has a dome shape so that raw beans may slip down from the upper end of the heated air blower and gather between the roasting vessel and the heated air blower when raw beans are put into the roasting vessel, and in which a guide skirt is formed on a lower end of the heated air blower to make hot air flow harmoniously into the heated air blower and is placed in a bowl.

6. The coffee bean roaster according to claim 1, wherein the exhaust holes are formed at the outer side of the guiding duct assembled with the lid so that smoke may be exhausted.

7. The coffee bean roaster according to claim 1, wherein the lower end of the bolster is skirt-shaped, a cord rolling member is installed for manually rolling in a power cord, and rubber feet are provided at the inner side for preventing slippage at the bottom.

8. The coffee bean roaster according to claim 1, wherein projection parts are formed on both of the outer sides of the handle duct and the duct connection part as a grip.

9. The coffee bean roaster according to claim 1, wherein the heater assembly is fixed, with the lower end mounted on the heater mounting projection and with the supporting spring of the upper end touching the supporting annular plate.

10. The coffee bean roaster according to claim 1, wherein a noise absorbing sponge for reducing mechanical noise of the motor and an electromagnetic wave shield iron plate for shielding electromagnetic waves are placed at the outer side.

11. The coffee bean roaster according to claim 1, wherein the spindle is inserted to the interior of said heated air blower so that a whirlwind generated from the interior of said heated air blower is easily exhausted through said blowing holes, and the pressing spring formed in the lower edge of said spindle is placed on the heater upper plate in order to fix said heater assembly.

12. The coffee bean roaster according to claim 1, wherein said heater assembly and the guide skirt of the air blower are placed in said bowl therein, an air inlet for absorbing the waste heat and the outer air is formed at the center of the bowl.

* * * * *